United States Patent
Lin et al.

(10) Patent No.: US 10,657,415 B2
(45) Date of Patent: May 19, 2020

(54) IMAGE CORRESPONDENCE DETERMINING METHOD AND APPARATUS

(71) Applicant: HTC Corporation, Taoyuan (TW)

(72) Inventors: Cheng-Hsien Lin, Taoyuan (TW); Po-Chuan Cho, Taoyuan (TW); Hung-Yi Yang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 149 days.

(21) Appl. No.: 15/975,792

(22) Filed: May 10, 2018

(65) Prior Publication Data
US 2018/0349737 A1 Dec. 6, 2018

Related U.S. Application Data

(60) Provisional application No. 62/514,026, filed on Jun. 2, 2017.

(51) Int. Cl.
*G06K 9/00* (2006.01)
*G06T 7/00* (2017.01)
(Continued)

(52) U.S. Cl.
CPC ......... *G06K 9/6218* (2013.01); *G06K 9/4609* (2013.01); *G06K 9/6215* (2013.01);
(Continued)

(58) Field of Classification Search
CPC .. G06K 9/6218; G06K 9/4609; G06K 9/6215; G06K 9/6256; G06K 9/6276; G06T 7/55; G06T 7/11; G06T 7/593; G06T 2207/10012; G06T 2207/10028; G06T 2207/20081; G06T 2207/20084
See application file for complete search history.

(56) References Cited

U.S. PATENT DOCUMENTS

2012/0045095 A1* 2/2012 Tate ................ G06T 5/003
                                                    382/103
2015/0110372 A1* 4/2015 Solanki ............ G16H 30/20
                                                    382/130
(Continued)

FOREIGN PATENT DOCUMENTS

WO    2017079278 A1    5/2017

OTHER PUBLICATIONS

Corresponding Taiwan office action dated May 14, 2019.

*Primary Examiner* — Ping Y Hsieh
(74) *Attorney, Agent, or Firm* — CKC & Partners Co., LLC

(57) ABSTRACT

An image correspondence determining method is provided that includes the steps outlined below. A first image and a second image are concatenated to generate a concatenated image having global information. Features are extracted from the concatenated image to generate a plurality of feature maps and the feature maps are divided into first feature maps and second feature maps. First image patches are extracted from the first feature maps corresponding to a first region and second image patches are extracted from the second feature maps corresponding to a second region. The first and the second image patches are concatenated to generate concatenated image patches. A similarity metric is calculated according to the concatenated image patches to determine a similarity between the first region and the second region.

12 Claims, 2 Drawing Sheets

(51) Int. Cl.
  *G06K 9/62* (2006.01)
  *G06K 9/46* (2006.01)
  *G06T 7/55* (2017.01)
  *G06T 7/11* (2017.01)
  *G06T 7/593* (2017.01)

(52) U.S. Cl.
  CPC ......... *G06K 9/6256* (2013.01); *G06K 9/6276* (2013.01); *G06T 7/11* (2017.01); *G06T 7/55* (2017.01); *G06T 7/593* (2017.01); *G06T 2207/10012* (2013.01); *G06T 2207/10028* (2013.01); *G06T 2207/20081* (2013.01); *G06T 2207/20084* (2013.01)

(56) References Cited

U.S. PATENT DOCUMENTS

2016/0314616 A1   10/2016   Su
2019/0087677 A1*  3/2019    Wolf ................... G06K 9/4628

* cited by examiner

IMAGE CORRESPONDENCE DETERMINING METHOD AND APPARATUS

RELATED APPLICATIONS

This application claims priority to U.S. Provisional Application Ser. No. 62/514,026, filed Jun. 2, 2017, which is herein incorporated by reference.

BACKGROUND

Field of Disclosure

The present disclosure relates to an image processing technology. More particularly, the present disclosure relates to an image correspondence determining method and an image correspondence determining apparatus.

Description of Related Art

Image correspondence determining technology is able to identify corresponding regions between two images. Though the existing technology estimates correspondence of rigid and textured objects well, the non-rigid and texture-poor regions in the images are difficult to identify. The learned feature descriptors are invariant to such as, but not limited to viewpoint, lighting, deformation or poor texture.

Accordingly, what is needed is an image correspondence determining method and an image correspondence determining apparatus to address the above issues.

SUMMARY

An aspect of the present disclosure is to provide an image correspondence determining method for performing image correspondence determining through a neural network system implemented by an image correspondence determining apparatus. The image correspondence determining method includes the steps outlined below. A first image and a second image are concatenated by a first concatenating unit to generate a concatenated image having global information. A plurality of features are extracted from the concatenated image by a convolutional neural network unit of the neural network system to generate a plurality of feature maps and the feature maps are divided into a plurality of first feature maps and a plurality of second feature maps. A plurality of first image patches are extracted from the first feature maps corresponding to a first region and a plurality of second image patches are extracted from the second feature maps corresponding to a second region by an image patch extracting unit. The first image patches and the second image patches are concatenated by a second concatenating unit to generate a plurality of concatenated image patches. A similarity metric is calculated according to the concatenated image patches by a metric learning network unit of the neural network system to determine a similarity between the first region and the second region.

Another aspect of the present disclosure is to provide an image correspondence determining apparatus that includes a storage unit and a processing unit. The storage unit is configured to store a plurality of computer-executable instructions. The processing unit is electrically coupled to the storage unit and is configured to retrieve and execute the computer-executable instructions to perform an image correspondence determining method for performing image correspondence determining through a neural network system implemented by the processing unit when the computer-executable instructions are executed. The image correspondence determining method includes the steps outlined below. A first image and a second image are concatenated by a first concatenating unit of the neural network system to generate a concatenated image having global information. A plurality of features are extracted from the concatenated image by a convolutional neural network unit of the neural network system to generate a plurality of feature maps and the feature maps are divided into a plurality of first feature maps and a plurality of second feature maps. A plurality of first image patches are extracted from the first feature maps corresponding to a first region and a plurality of second image patches are extracted from the second feature maps corresponding to a second region by an image patch extracting unit of the neural network system. The first image patches and the second image patches are concatenated by a second concatenating unit of the neural network system to generate a plurality of concatenated image patches. A similarity metric is calculated according to the concatenated image patches by a metric learning network unit of the neural network system to determine a similarity between the first region and the second region.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
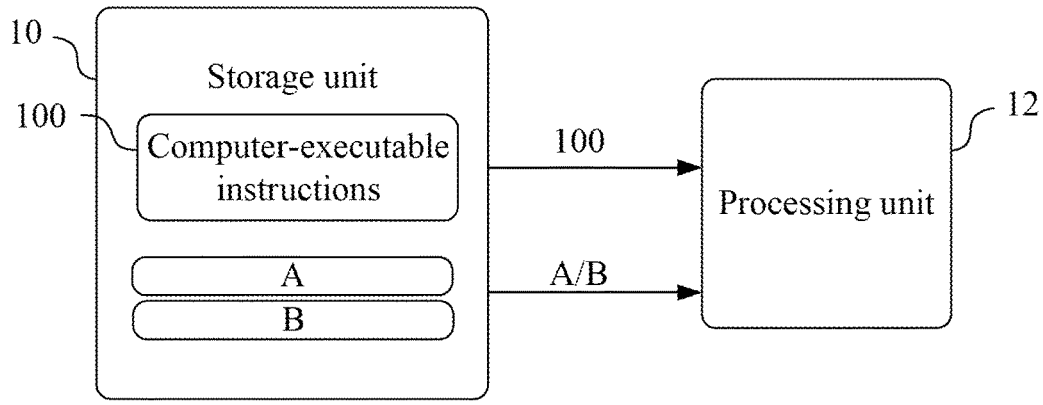
FIG. 1 is a block diagram of an image correspondence determining apparatus in an embodiment of the present invention.

FIG. 1 is a block diagram of an image correspondence determining apparatus 1 in an embodiment of the present invention. The image correspondence determining apparatus 1 includes a storage unit 10 and a processing unit 12.

In an embodiment, the storage unit 10 can be such as, but not limited to CD ROM, RAM, ROM, floppy disk, hard disk or optic magnetic disk. The storage unit 10 is configured to store a plurality of computer-executable instructions 100.

The processing unit 12 is electrically coupled to the storage unit 10. In an embodiment, the processing unit 12 is configured to retrieve and execute the computer-executable instructions 100 to operate the function of the image correspondence determining apparatus 1 accordingly. More specifically, the processing unit 12 receives a first image A and a second image B to perform image correspondence determining thereon to identify a similarity between a first region of the first image A and a second region of the second image B. In different embodiments, the first region and the second region can either be the same or different.

In an embodiment, the processing unit 12 receives the first image A and the second image B stored in the storage unit 10, as illustrated in FIG. 1. In other embodiments, the processing unit 12 may receive the first image A and the second image B from a remote server (not illustrated) by using such as, but not limited to a communication unit (not illustrated) through a wired or a wireless way.

Figure 2:
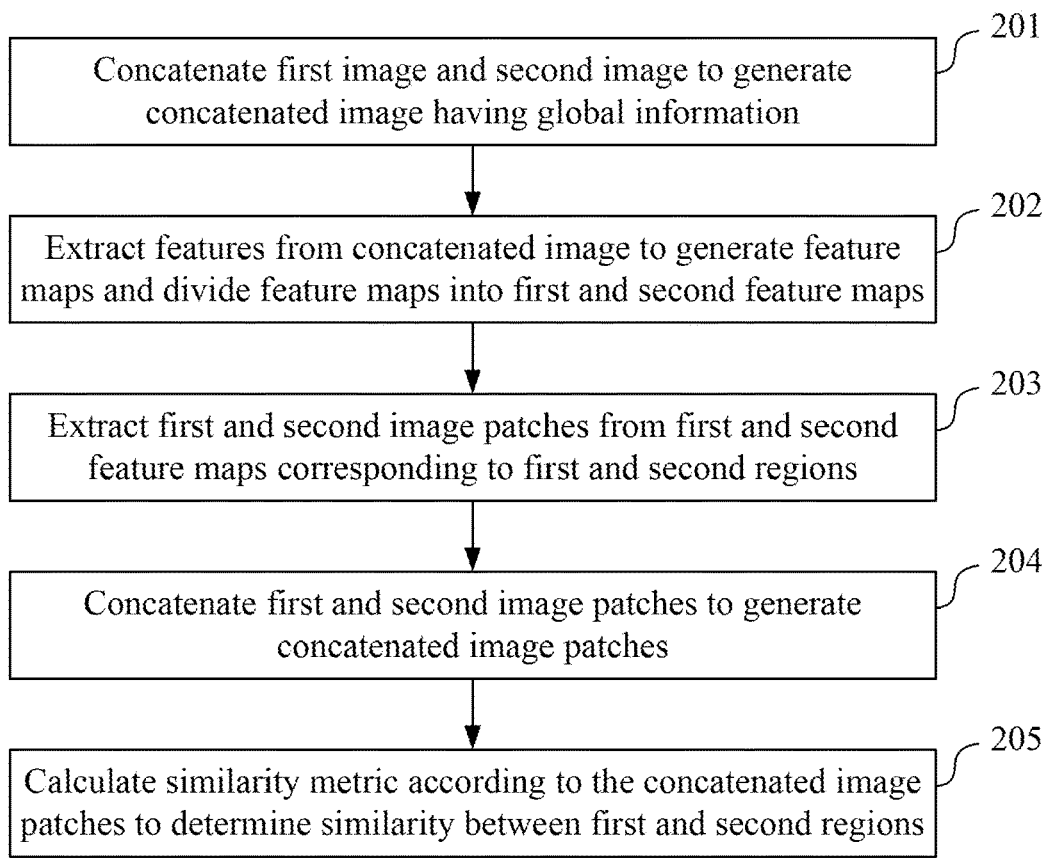
FIG. 2 is a flow chart of an image correspondence determining method in an embodiment of the present invention.
Figure 3:
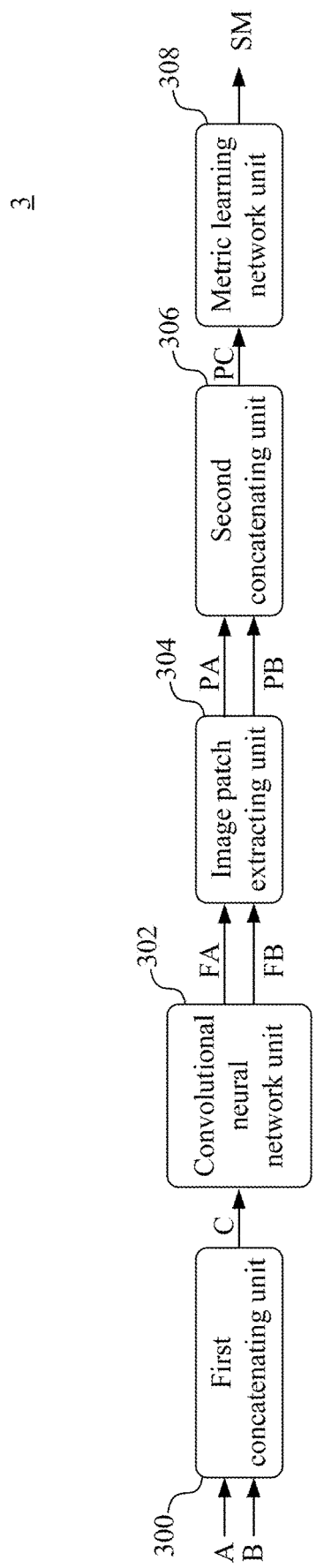
FIG. 3 is a block diagram of a neural network system implemented by the image correspondence determining apparatus in an embodiment of the present invention.

Reference is now made to FIG. 2 and FIG. 3 at the same time. The detail of the function of the image correspondence determining apparatus 1 is described in the following paragraphs in accompany with FIG. 2 and FIG. 3.

FIG. 2 is a flow chart of an image correspondence determining method 200 in an embodiment of the present invention. The image correspondence determining method 200 can be used in the image correspondence determining apparatus 1 illustrated in FIG. 1.

In FIG. 3 is a block diagram of a neural network system 3 implemented by the image correspondence determining apparatus 1 in an embodiment of the present invention, in which the computer-executable instructions 100 operate as the neural network system 3 when being executed by the processing unit 12 to perform the image correspondence determining method 200. In an embodiment, the neural network system 3 includes a first concatenating unit 300, a convolution neural network unit 302, an image patch extracting unit 304, a second concatenating unit 306 and a metric learning network unit 308.

The image correspondence determining method 200 includes the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 201, the first image A and the second image B are concatenated by the first concatenating unit 300 to generate a concatenated image C having global information.

In an embodiment, both of the first image A and the second image B have the same width W, the same height H and the same depth D1. As a result, the dimension of each of the first image A and the second image B can be expressed as X*H*D1. In an embodiment, the depth D1 of each of the first image A and the second image B is the number of the channels (e.g. the channels of R, G and B) thereof, which is 3.

The first concatenating unit 300 concatenates the first image A and the second image B to generate the concatenated image C having the global information, in which the global information includes the information across the first image and the second image. The concatenated image C has the same width and the same height as the first image A and the second image B and has a depth that is the sum of the depths of the first image A and the second image B. More specifically, the concatenated image C has the width W, the height H and the depth 2*D1. As a result, the dimension of the concatenated image C can be expressed as X*H*(2*D1).

In an embodiment, when the depth D1 of each of the first image A and the second image B is 3, the depth of the concatenated image C is 6.

In step 202, a plurality of features are extracted from the concatenated image C by the convolutional neural network unit 302 to generate a plurality of feature maps and the feature maps are divided into a plurality of first feature maps FA and a plurality of second feature maps FB.

In an embodiment, the convolutional neural network unit 302 includes a plurality of convolutional neural network layers (not illustrated). For example, the convolutional neural network layers may include an input layer, at least one hidden layer and an output layer. The input layer may include a plurality of inputs matching the number of channels of the concatenated image C (e.g. 6) configured to receive the concatenated image C. The hidden layer performs operations on the received concatenated image C such that the output layer generates the first feature maps FA and the second feature maps FB.

In an embodiment, the convolutional neural network layers are operated with learned weights. Since the convolutional neural network unit 302 performs operation on the concatenated image C including the global information of the first image A and the second image B, the convolutional neural network unit 302 can operate as a feature extractor that extracts dense distinguished features.

In an embodiment, the convolutional neural network unit 302 may use labels to identify whether the inputs are from the same class or not to learn a representation with the property, in which instances of the same class are clustered and separated from instances of other classes.

In an embodiment, each of the first feature maps FA and the second feature maps FB has the same width W and the same height H with the concatenated image C. The first feature maps FA and the second feature maps FB have the same depth D2. In an embodiment, when the value of the depth D2 is set to be larger (i.e. deeper), the accuracy of the determination of the correspondence is higher while the speed of processing is slower. On the contrary, when the value is set to be smaller, the accuracy of the determination of the correspondence is lower while the speed of processing is higher. As a result, based on practical applications, the depth D2 can be predetermined to an appropriate value that can accomplish higher accuracy with a reasonable processing speed, such as, but not limited to 30 or 100.

In step 203, a plurality of first image patches PA are extracted from the first feature maps FA corresponding to a first region and a plurality of second image patches PB are extracted from the second feature maps FB corresponding to a second region by the image patch extracting unit 304.

In an embodiment, the first region and the second region are the regions of the first image A and the second image B that the correspondence thereof is to be determined. More specifically, when the correspondence between the first region and the second region of the first image A and the second image B is to be determined, the first image patches PA and the second image patches PB that have the coordinates correspond to the first region and the second region can be extracted from the first feature maps FA and the second feature maps FB instead of the first image A and the second image B.

Each of the first image patches PA and the second image patches PB may have a width of W' and a height of H'. For example, the width W' and the height H' of each of the first image patches PA and the second image patches PB can be 10 pixels. Since the first image patches PA and the second image patches PB are extracted from the feature maps FA and the second feature maps FB, the first image patches PA and the second image patches PB have the same depth D2.

In step 204, the first image patches PA and the second image patches PB are concatenated by the second concatenating unit 306 to generate a plurality of concatenated image patches PC.

The second concatenating unit 306 concatenates the first image patches PA and the second image patches PB to generate the concatenated image patches PC that has the width W, the height H' and the depth 2*D2. As a result, the dimension of the concatenated image patches PC can be expressed as X'*H'*(2*D1).

In step 205, a similarity metric SM is calculated according to the concatenated image patches PC by the metric learning network unit 308 to determine a similarity between the first region and the second region.

In an embodiment, the metric learning network unit 308 is also a convolutional neural network that includes a plurality layers with learned weights similar to the convolutional neural network unit 302. By performing operation on the concatenated image patches PC, the metric learning network unit 308 generates the similarity metric SM that represents the metric between the first region and the second region.

The image correspondence determining apparatus 1 and the image correspondence determining method 200 perform image correspondence determining by concatenating the first image A and the second image B. Not only the configuration of the neural network system 3 implemented by the image correspondence determining apparatus 1 is simplified to reduce the memory cost and obtain a faster inference time due to the use of only a single convolutional neural network unit 302, the global information, i.e. the information across the first image and the second image, can also be taken into consideration.

Further, the learning similarity metric is used to determine the similarity between the first image and the second image. Due to the use of the global information of the images and the learning similarity metric, a robust ability against different environments, e.g. different viewpoints, lightings, deformations and textures, is provided.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image correspondence determining method for performing image correspondence determining through a neural network system implemented by an image correspondence determining apparatus, the image correspondence determining method comprising:
concatenating a first image and a second image by a first concatenating unit of the neural network system to generate a concatenated image having global information;
extracting a plurality of features from the concatenated image by a convolutional neural network unit of the neural network system to generate a plurality of feature maps and dividing the feature maps into a plurality of first feature maps and a plurality of second feature maps;
extracting a plurality of first image patches from the first feature maps corresponding to a first region of the first image and extracting a plurality of second image patches from the second feature maps corresponding to a second region of the second image by an image patch extracting unit of the neural network system;
concatenating the first image patches and the second image patches by a second concatenating unit of the neural network system to generate a plurality of concatenated image patches; and
calculating a similarity metric according to the concatenated image patches by a metric learning network unit of the neural network system to determine a similarity between the first region and the second region.

2. The image correspondence determining method of claim 1, wherein the convolutional neural network unit comprises a plurality of convolutional neural network layers operated with learned weights.

3. The image correspondence determining method of claim 1, wherein the first image, the second image, the first feature maps and the second feature maps have a same width and a same height.

4. The image correspondence determining method of claim 1, wherein the first image and the second image has a same depth, and the concatenated image has a total depth equal to a sum of the depth of each of the first image and the second image.

5. The image correspondence determining method of claim 1, wherein the first feature maps, the second feature maps, the first image patches and the second image patches have a same depth, and the concatenated image patches have a total depth equal to a sum of the depths of the first image patches and the second image patches.

6. The image correspondence determining method of claim 1, wherein the global information comprises the information across the first image and the second image.

7. An image correspondence determining apparatus comprising:
a storage unit configured to store a plurality of computer-executable instructions; and
a processing unit electrically coupled to the storage unit and configured to retrieve and execute the computer-executable instructions to perform an image correspondence determining method for performing image correspondence determining through a neural network system implemented by the processing unit when the computer-executable instructions are executed, wherein the image correspondence determining method comprises:
concatenating a first image and a second image by a first concatenating unit of the neural network system to generate a concatenated image having global information;
extracting a plurality of features from the concatenated image by a convolutional neural network unit of the neural network system to generate a plurality of feature maps and dividing the feature maps into a plurality of first feature maps and a plurality of second feature maps;
extracting a plurality of first image patches from the first feature maps corresponding to a first region of the first image and extracting a plurality of second image patches from the second feature maps corresponding to a second region of the second image by an image patch extracting unit of the neural network system;
concatenating the first image patches and the second image patches by a second concatenating unit of the neural network system to generate a plurality of concatenated image patches; and
calculating a similarity metric according to the concatenated image patches by a metric learning network unit of the neural network system to determine a similarity between the first region and the second region.

8. The image correspondence determining apparatus of claim 7, wherein the convolutional neural network unit comprises a plurality of convolutional neural network layers operated with learned weights.

9. The image correspondence determining apparatus of claim 7, wherein the first image, the second image, the first feature maps and the second feature maps have a same width and a same height.

10. The image correspondence determining apparatus of claim 7, wherein the first image and the second image has a same depth, and the concatenated image has a total depth equal to a sum of the depth of each of the first image and the second image.

11. The image correspondence determining apparatus of claim 7, wherein the first feature maps, the second feature maps, the first image patches and the second image patches have a same depth, and the concatenated image patches have a total depth equal to a sum of the depths of the first image patches and the second image patches.

12. The image correspondence determining apparatus of claim 7, wherein the global information comprises the information across the first image and the second image.

* * * * *